UNITED STATES PATENT OFFICE.

EMERICH SZARVASY, OF BUDAPEST, HUNGARY.

PROCESS FOR THE MANUFACTURE OF CARBON ELECTRODES.

1,392,267. Specification of Letters Patent. Patented Sept. 27, 1921.

No Drawing. Application filed June 3, 1920. Serial No. 386,409.

*To all whom it may concern:*

Be it known that I, EMERICH SZARVASY, a citizen of Hungary, residing at Budapest, Hungary, have invented certain new and useful Improvements in Processes for the Manufacture of Carbon Electrodes, for which I have filed applications in Hungary, November 29, 1917, and Germany, December 6, 1917, of which the following is a specification.

Carbon electrodes have been usually made hitherto by taking finely powdered petroleum coke or gas retort carbon, that is to say, the purest possible carbon free from ash, and kneading it intimately with tar, ramming or pressing the mixture in molds and burning it at a high temperature.

The good quality of such electrodes depends essentially on the one hand upon the purity and physical nature of the raw materials and on the other hand upon the greatest possible degree of intimacy of mixture and kneading the carbon with the tarry binding agent.

The present invention has for its object to provide an improved process for the manufacture of carbon electrodes which is superior as regards the above stated requirements to all processes hitherto known.

According to the improved process of this invention, natural gas is subjected to a cracking operation by heat in an outwardly heated tube or the like, in such a manner as to produce a mixture of soot and tar. By suitably selecting the temperature and duration of the heated zone of the tube, and of the velocity of flow of the natural gas, the splitting and condensation of the natural gas, and of its products of decomposition, can be regulated in such a manner as to produce on the one hand the greatest possible yield of carbon or soot, and the greatest possible percentage of tar.

If for instance a tubular decomposing chamber is used, having a length of 1.20 m. and a diameter of 0.20 m., through which methane is passed at a velocity of 2 m$^3$ per hour, while the temperature is kept at approximately 950° C., the produced carbon will contain about 20% tarry substances.

Apart from the fact that the carbon produced in this manner is practically entirely free from foreign admixtures, especially ash, the product of the improved process has the particularly favorable property that owing to the simultaneous formation of carbon and tar these two substances exist in such intimate and so to speak molecular mixture, as cannot be attained by comminuting ever so finely a carbon produced by other means, or by mixing and kneading it with tar ever so thoroughly.

Owing to this fact a comparatively smaller percentage of tar in the composition is sufficient to give useful electrodes, than with other processes of manufacture hitherto known, while the texture of the electrodes is more uniform and more favorable.

If the highest possible yield of carbon is desired, the amount of tar produced simultaneously therewith may in some circumstances be so low as to require the addition of further amounts of tar or the like. The fact however that the carbon is already saturated with tar in a very intimate and uniform degree, has a favorable action upon the uniform distribution and absorption of further quantities of tar by the carbon.

The intimate mixture produced in this manner is molded in the usual way, for instance by ramming and pressing and is then burned.

What I claim is:—

1. A process for the manufacture of carbon electrodes, which consists in subjecting natural gas to a cracking operation by heat in a continuous flow in a decomposing vessel, in such a manner, as to produce a mixture of soot and tar, removing the mixture, and molding and burning it in the usual way.

2. A process for the manufacture of carbon electrodes, which consists in subjecting natural gas to a cracking operation by heat in a continuous flow in a decomposing chamber in such a manner as to produce a mixture of soot and tar, removing the mixture, which after the addition of known binding agents, is molded and burned in the usual way.

In testimony whereof I have signed my name to this specification.

EMERICH SZARVASY.

Witnesses:
   CHAS. MEDQYSS,
   EUGENE HARSANI.